Aug. 23, 1932. I. B. LASKOWITZ 1,872,758
VARIABLE THRUST MECHANISM
Filed Nov. 25, 1930 4 Sheets-Sheet 1
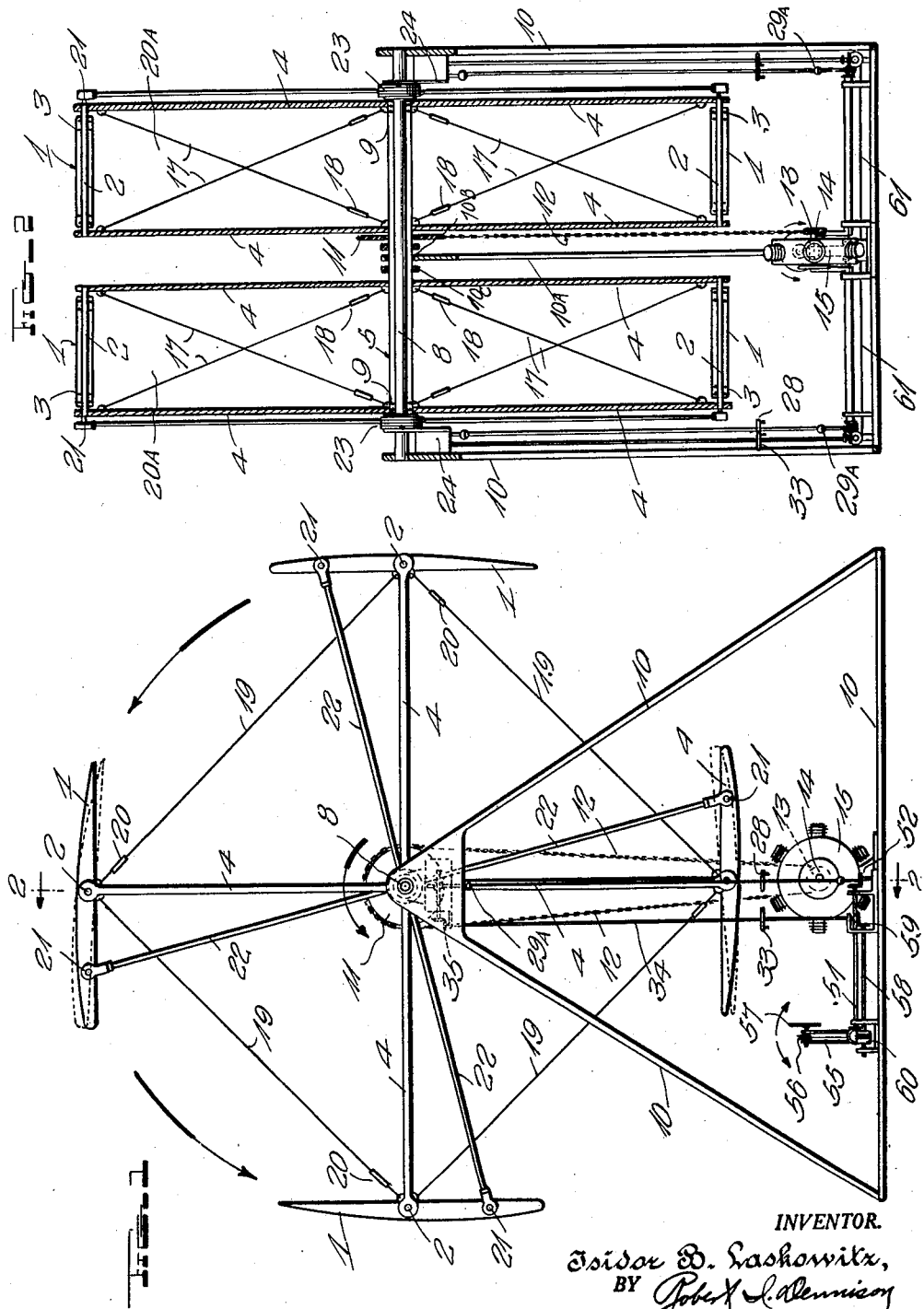
INVENTOR.
Isidor B. Laskowitz,
BY
ATTORNEY.

Aug. 23, 1932.   I. B. LASKOWITZ   1,872,758
VARIABLE THRUST MECHANISM
Filed Nov. 25, 1930   4 Sheets-Sheet 2
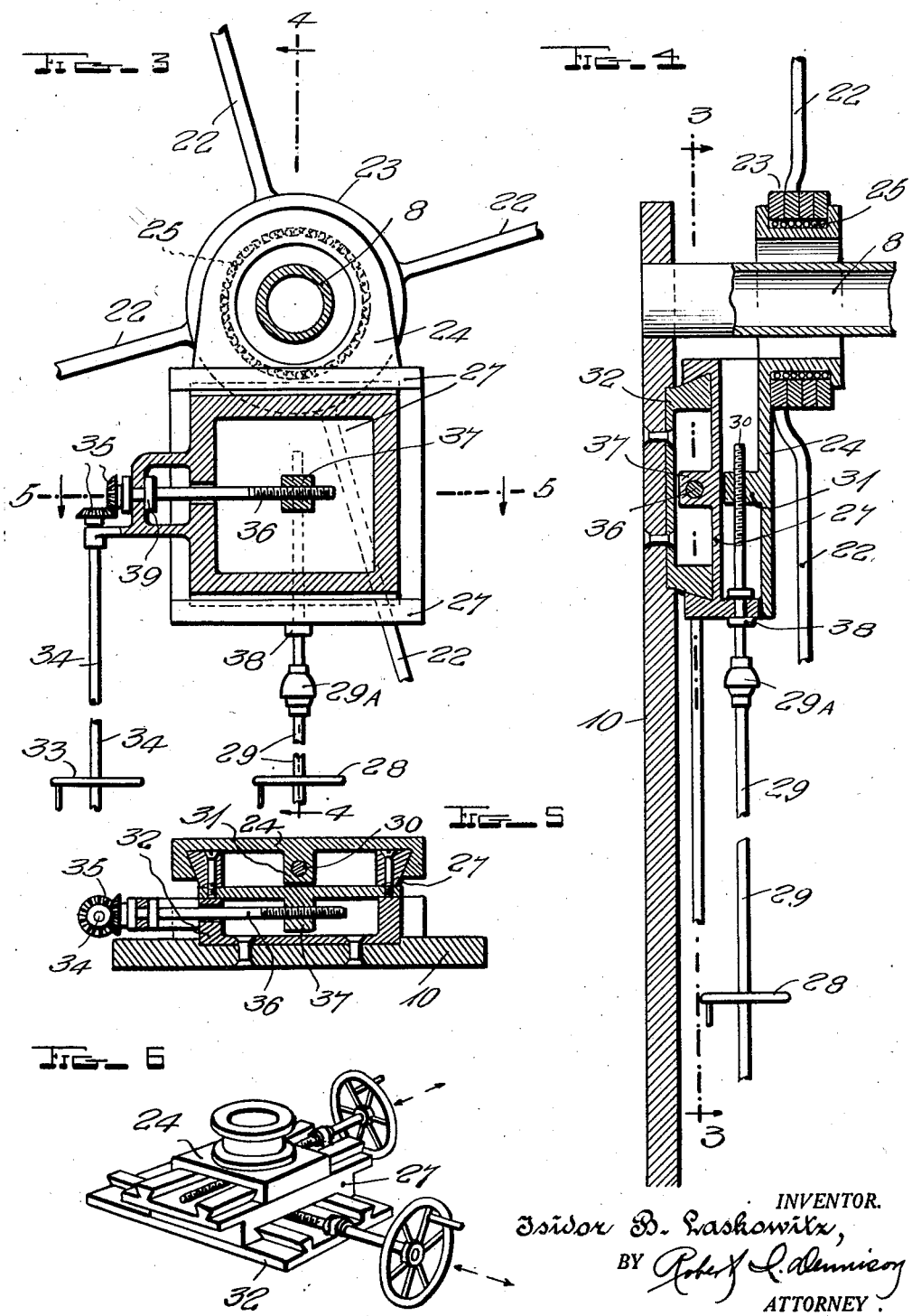
INVENTOR.
Isidor B. Laskowitz,
BY Robert L. Dennison
ATTORNEY.

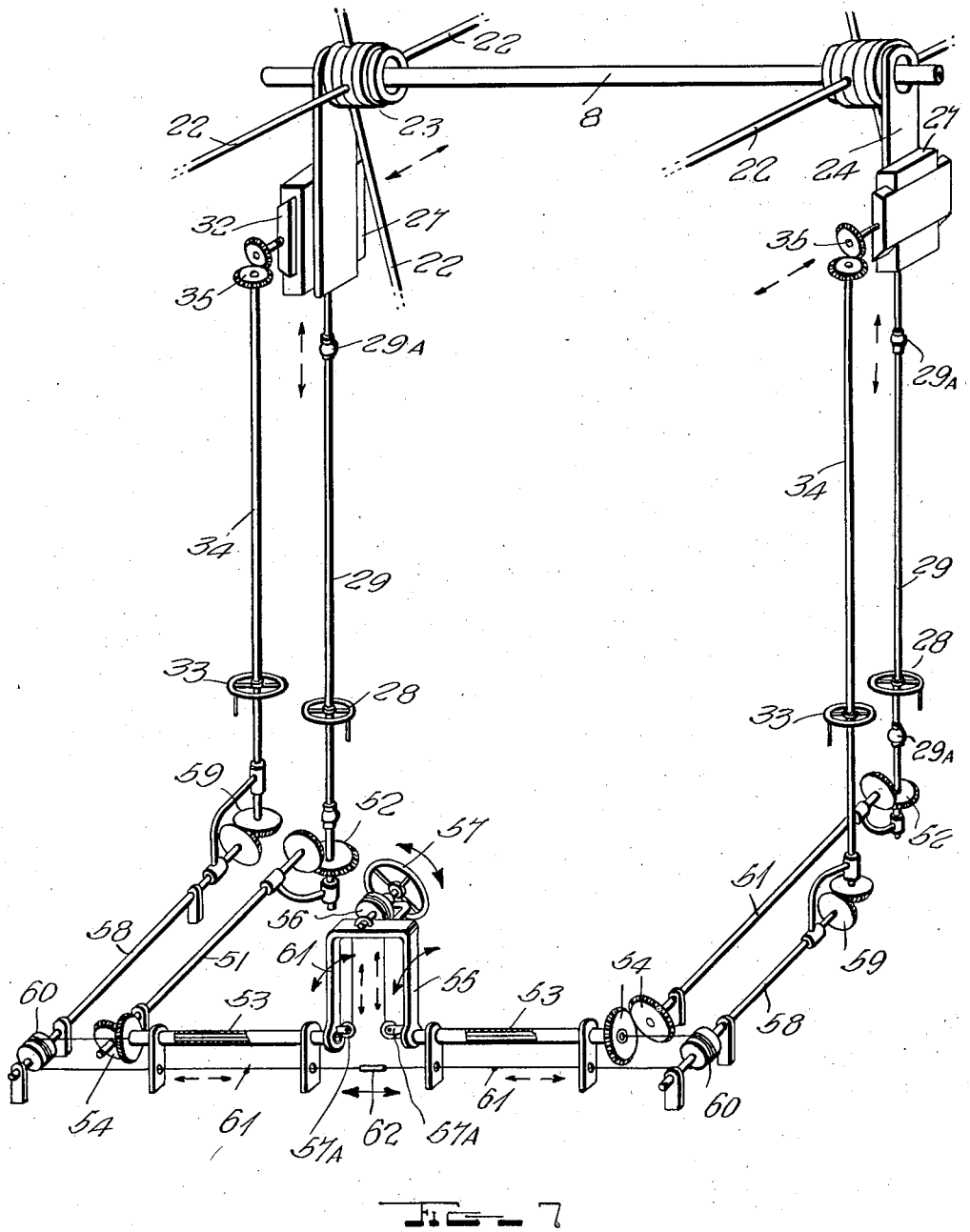

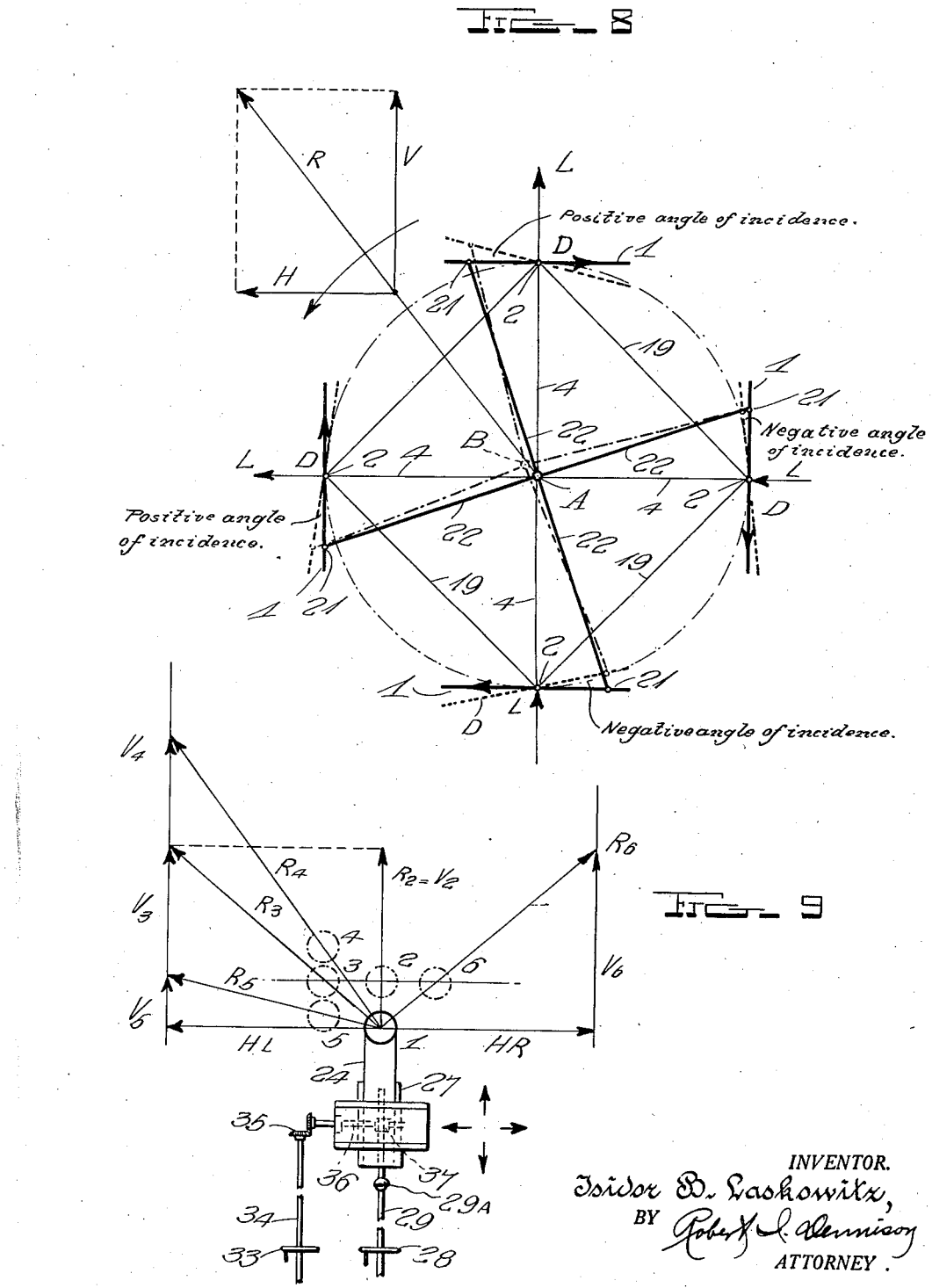

Patented Aug. 23, 1932    1,872,758

UNITED STATES PATENT OFFICE

ISIDOR B. LASKOWITZ, OF BROOKLYN, NEW YORK

VARIABLE THRUST MECHANISM

Application filed November 25, 1930. Serial No. 498,166.

The present invention relates to a variable thrust mechanism for use upon aircraft, land vehicles, watercraft and any other type of craft requiring a mechanical propulsion means.

Another important object is to provide a variable thrust mechanism that is of such construction as to be capable of being operated in air, water or any other gas or fluid.

Still a further object is to provide a variable thrust mechanism whereby the direction and intensity of thrust can be varied in a plane surface, regardless of the position of said surface.

Another object resides in the provision of a variable thrust mechanism of the above mentioned character wherein the thrust (push or pull) from zero to a maximum may be varied with the motor, engine or other prime mover operating at a constant maximum speed in one direction.

A further important and salient object is to provide a variable thrust mechanism having means for laterally controlling or adjusting the mechanism in order to maintain lateral balance or stability.

Still another object is to provide a variable thrust mechanism that includes a number of pivotally mounted airfoils, wings, planes, vanes, or the like that rotate about a common axis, and means being provided for adjusting the airfoils with respect to one another to vary the resultant thrust in any desired direction, it being understood that the airfoils are arranged in such relation with respect to the axis so that all of the airfoils will have a uniform velocity.

Another object is to provide a variable thrust mechanism of the above mentioned character which is simple in construction, strong and durable, the parts being so arranged as to facilitate ready and easy adjustment whenever necessary.

Other objects and advantages of the present invention will become apparent from the following description when taken in connection with the accompanying drawings.

In the accompanying drawings, wherein like reference characters designate corresponding parts throughout the several views:

Figure 1 is an elevational view of the variable thrust mechanism embodying my invention;

Figure 2 is a vertical sectional view taken approximately on the line 2—2 of Figure 1;

Figure 3 is an enlarged detail view partly in elevation and partly in section of the airfoils or vane angle controlling mechanism, the section being taken on the line 3—3 of Figure 4;

Figure 4 is a vertical sectional view taken approximately on the line 4—4 of Figure 3;

Figure 5 is a transverse section taken substantially on the line 5—5 of Figure 3;

Figure 6 is a detail perspective view of a modification of the airfoil or vane angle controlling means embodying the same principles as the controlling means disclosed in the preferred form, but placed in a horizontal position;

Figure 7 is a perspective view of the wheel and rocking bridge control mechanism showing the arrangement of each set of airfoil or vane angle controlling means and the interconnecting control elements including the control wheel, rocking bridge, shaft, steering and operating cables;

Figure 8 is a diagrammatic illustration of the variable thrust mechanism showing how the angle of inclination or incidence of the airfoils or vanes may be changed by adjustment of the position of the airfoil or vane angle controlling means so as to produce a definite direction of thrust; and Figure 9 is also a diagrammatic illustration of the different positions of center of the eccentric bracket in relation to the supporting spindle or shaft.

In the drawings, the preferred embodiment of the invention is adapted for use on aircraft. The airfoils, planes, vanes, wings or blades are designated by the numeral 1 and are constructed of any suitable material. Each airfoil or vane is pivotally mounted at its intermediate portion and is movable about the tubular member 2, there being radial and thrust ball bearings associated with the supporting member 2 as indicated at 3. Each supporting member 2 is rigidly secured between the outer ends of each pair of radial arms or spokes 4, the latter being secured to and carried by the sleeve or tubular member 5.

The parts that are secured together are preferably welded to each other although any other method of rigidly securing the elements together may be employed if desired.

As clearly shown in Figure 2 of the drawings, two sets of rotating units are employed, each set consisting of a series of pivoted airfoils and pairs of radial arms or spokes.

The sleeve 5 is mounted on the hollow spindle 8, the latter extending horizontally and being rigidly secured at its respective ends in the upper ends of spaced vertical standards that extend upwardly from a base and which structure constitutes a supporting frame denoted generally by the numeral 10. Combined radial and thrust ball bearings are provided so that the sleeve 5 will be free to rotate above the stationary shaft or spindle 8.

An additional support is provided for the intermediate portion of the spindle 8 and the sleeve 5 by means of a middle frame portion 10a, ball bearings 10b and collars 10c being provided for centering purposes as well as taking up any sidewise movement.

A sprocket wheel 11 is carried by the intermediate portion of the sleeve 5 for rotation therewith and a chain 12 connects the sprocket wheel 11 and the sprocket wheel 13 mounted on the drive shaft 14 of the engine or motor 15 that is arranged on the base of the supporting frame 10. The radial arms or spokes 4 are braced laterally by means of the tie rods or wires 17 and turnbuckles 18 are associated with these tie members. Similar tie members 19 that are provided with turn buckles 20 brace the radial arms or spokes circumferentially as clearly illustrated in the drawings.

The tubular member 2 and the sleeve 5, together with the radial arms or spokes and the several tie members form a cage 20a, two of such cage units being provided. Rotation of the airfoils or vanes in the direction shown by the arrows is accomplished by the engine driving the cages through the medium of the shaft 14, the sprocket wheels 11 and 13 and the chain 12. Each cage unit carries a set of airfoils or vanes 1 and each set is placed side by side.

Extending laterally from the outer side of each airfoil or vane 1 and being rigidly secured thereto is a pin 21. Pivotally mounted on each pin 21 is the eccentric or actuating arm 22 that terminates at its inner end near the center of the cage 20a, in the ring 23. The four rings on the outer side of each cage 20a are carried by an adjustable eccentric bracket 24.

Ball bearings 25 are provided between the rings and the eccentric bracket for free movement between the two.

Each eccentric bracket 24 is slidably mounted on its respective slotted member 27 and can be moved vertically by actuating the hand-wheels 28 which rotate the shafts or spindles 29. The upper end of each shaft or spindle 29 is threaded as indicated at 30 and extends through the threaded boss 31 carried by each of the eccentric brackets 24.

The slotted member 27 on each side of the mechanism is also slidably mounted on its respective frame member 32 that is secured to the frame 10. This construction provides means whereby a lateral adjustment may be afforded by rotating the handwheels 33 that are associated with the shafts or spindles 34. Suitable bevel gears 35 operatively connect the shaft 34 with the threaded spindles 36 and these threaded spindles or shafts 36 are in turn operatively associated with internally threaded bosses 37 secured to the respective slotted member 27 as is clearly illustrated in Figures 3 and 5 of the drawings.

Suitable bearings 38 and 39, respectively, are mounted on the slotted members 27 and the frame members 32 to take the thrust produced by the threaded spindles or shafts 29 and 36 respectively.

It might be well at this point to mention the fact that the length of the eccentric arms 22 is adjustable by having the outer end of each arm threaded within a suitable socket that is operatively connected to the respective laterally extending pin 21. In this manner, the angle or inclination of each airfoil or vane 1 may be properly set for the most efficient working conditions.

By actuating the adjusting wheels 28 and 33, the eccentric brackets 24 located at the outer sides of the cages can be moved to any desired eccentric position in relation to the axis of the sleeve 5 from their normal concentric position shown in Figures 3 and 4 and at "A" in Figure 8. Thus, each set of airfoils or vanes 1 is capable of being independently adjusted by means of the handwheels 28 and 33 on their respective sides of the mechanism.

The full lines in Figure 8 show the normal concentric position of the eccentric brackets 24, namely at "A", and the relation thereto of the airfoils or vanes 1 and eccentric arms 22. Referring to this particular figure of the drawings, the dotted circle "B" shows a particular position of the eccentric bracket 24 displaced, in relation to the normal or concentric position "A" and dotted lines show the position of the airfoils or vanes 1 and the eccentric arms 22 in relation thereto.

With the eccentric bracket 24 in the position "A", when the cages are rotated, the airfoils or vanes 1 all being set at the same inclination (which in this case is zero), will offer resistance or drag D parallel to the direction of movement and any reaction or lift L set up at right angles to the direction of movement of the airfoils or vanes 1, will be the same, and no resultant or unbalanced thrust will be created tending to move the cages. However, with the eccentric bracket 24 in the position "B", when the cages are rotated, the airfoils or vanes will be inclined as shown in the dotted lines in Figure 8. In this position, the airfoils or vanes 1 offer resistance or drag D parallel to the direction of movement, and will also set up different reactions or lifts L at right angles to the direction of movement for the various airfoils or vanes. The result is that an unbalanced or resultant force R is created that tends to move the cages in the directions shown by the arrow marked "R".

The resultant force R has a vertical component V and a horizontal component H. As the cages are rotated, in each complete revolution, with eccentric bracket 24 in the position "B", each airfoil or vane will move through all the positions shown in the dotted lines, being actuated by the eccentric arms 22, the latter pivoting about the ring portions of the respective eccentric brackets 24.

Thus by adjusting the eccentric bracket 24 through the manipulation of the handwheels 28 and 33, it is possible with the engine or motor 15 rotating in one direction, to vary the resultant thrust in any desired direction; whether it be up, down, to the right or left, or any other intermediate position, and, if desired, to reduce the resultant thrust to zero.

Attention is now particularly directed to Figure 7 of the drawings wherein there is disclosed the wheel and rocking bridge control mechanism which will now be described in detail. The shafts 29 on each side of the mechanism extend downward and drive the shafts 51 through bevelled gears 52. Universal joints, 29a, are provided near the top and bottom of the shaft 29 to allow for their inclination when the eccentric brackets 24 are moved from side to side. The shafts 51, in turn, drive the hollow shafts 53 through the medium of the bevelled gears 54.

Secured to the inner ends of the shaft 53, is the rocking bridge 55. A grooved wire rope drum 56 is mounted on the top of the bridge 55 and is capable of being turned by means of the control wheel 57. Mounted on the bottom of the bridge 55, are the guide sheaves 57a. The shafts 34, that are arranged at the outer sides of the mechanism also extend downward and drive the shafts 58 through bevelled gears 59. The shafts 58 have secured at one end, the grooved pulleys 60 and a wire rope control cable 61 passes around the drum 56, the sheaves 57a through the hollow shaft 53 and around the respective pulleys 60. The ends of the wire cable are connected together by turnbuckle illustrated at 62.

The parts are so arranged that by turning the control wheel 57, in one direction, both eccentric brackets 24 will move in a horizontal direction, to one side, and by reversing this direction of rotation, will move both brackets in a horizontal direction to the opposite side. Also by moving the rocking bridge 55 in one direction from its vertical, that is inclining the bridge, one eccentric bracket will move vertically, upwardly, while the other eccentric bracket 24 will move vertically in a downward direction. By actuating the rocking bridge in the opposite direction from the vertical, that is, inclining the bridge, the movements of the eccentric brackets 24 will be reversed.

Since the direction of the resultant thrust of the mechanism depends on the location of the eccentric brackets 24 and the intensity of this resultant thrust depends upon the distance that the eccentric brackets 24 are displaced from their normal concentric position, it is possible, with the control described, not only to vary the resultant thrust and hence the direction of movement of the mechanism in a vertical plane, but also to balance the mechanism laterally.

Again referring to Figure 8 and taking the same in connection with Figure 9, the setting and operation of the mechanism is carried out as follows: Both eccentric brackets 24 are first placed in their normal concentric position as at "1"; the airfoil or vanes 1 in this position are so set that no resultant thrust in any particular direction results, all forces being balanced. Both eccentric brackets 24 are then moved vertically to position "2"; in this position, the resultant thrust on the mechanism is substantially vertical. The intensity of this vertical thrust can be increased or decreased by increasing or decreasing the speed of the engine, so that a raising or lowering of the mechanism will take place.

When the proper position "2" has been determined and adjusted, the handwheels 28 and 33 are thereafter no longer used in normal operation, and the wheel and rocking bridge control mechanism adjusted so that the rocking bridge 55 is set in a vertical position. Forward movement of the mechanism is accomplished by turning the contorol wheel 57 so that both eccentric brackets 24 are moved to position "3"; backward movement of the mechanism is accomplished by turning control wheel 57 in the opposite direction, so that both eccentric brackets 24 are moved to position "6".

Lateral control of the mechanism is accomplished with the eccentric brackets 24 in either position "2"; "3"; or "6", by rocking the bridge 55 either forward or backward. This has the effect of raising one eccentric bracket and lowering the other and vice versa; thus, altering the vertical components of the thrust and the mechanism is thereby balanced laterally. Positions "4" and "5"

show locations of eccentric brackets 24 when the latter are displaced from their positions "3" by the rocking of the bridge 55.

A variable thrust mechanism of the above mentioned character may be used on aircraft, landcraft, watercraft and the same will at all times be positive and efficient in carrying the purposes for which it is designed. Furthermore, the parts are so arranged as to facilitate the ready and easy adjustment for accomplishing the desired results.

While I have shown the preferred embodiment of the invention, it is to be understood that minor changes in the size, shape and arrangement of parts may be resorted to without departing from the spirit of the invention and the scope of the appended claims.

Having thus described my invention, what I claim is:

1. In a variable thrust mechanism, coacting rotatable units, a support therefor, movable airfoils mounted on each unit, means for adjusting the airfoils to vary the resultant thrust in a vertical plane, and additional means for laterally adjusting the mechanism to maintain lateral balance for all directions of said resultant thrust.

2. In a variable thrust mechanism, coacting rotatable units, a support therefor, pivotally mounted airfoils at the periphery of each unit, eccentric arms connected at their outer ends to the respective airfoils, a member operatively connecting the inner ends of said eccentric arms, said member being adaptable of movement for adjusting the airfoils to vary the resultant thrust in any direction, and additional means for laterally adjusting the mechanism to maintain lateral balance for all directions of said resultant thrust.

3. In a variable thrust mechanism, coacting rotatable units, a support therefor, pivotally mounted airfoils at the periphery of each unit, eccentric arms connected at their outer ends to the respective airfoils and a vertically adjustable member operatively connecting the inner ends of said eccentric arms to adjust the airfoils, to vary the resultant thrust in a vertical plane, and additional means for laterally adjusting said member to maintain lateral balance.

4. In a variable thrust mechanism, a supporting shaft, a pair of cages rotatably mounted on said shaft, a series of airfoils, pivotally mounted at the periphery of each cage, rings encircling the shaft and being spaced therefrom, arms operatively connected at their inner ends with each ring, the outer ends of said arms being eccentrically connected to the respective airfoils, means for moving each ring with respect to the shaft to adjust the airfoils and to vary the resultant thrust in any direction, and additional means for laterally adjusting the mechanism to maintain lateral balance for all directions of said resultant thrust.

5. In a variable thrust mechanism, a supporting shaft, a pair of cages rotatably mounted on said shaft, a series of airfoils pivotally mounted at the periphery of each cage, rings encircling the shaft and being spaced therefrom, arms operatively connected at their inner ends with each ring, the outer ends of said arms being eccentrically connected to the respective airfoils, means for moving each ring vertically for adjusting the airfoils to vary the resultant thrust in a vertical plane, and additional means for moving each ring laterally in a horizontal plane to maintain lateral balance.

6. In a variable thrust mechanism, a support, a horizontal spindle mounted on the support, a pair of cage units rotatably supported on said spindle, a series of spaced airfoils pivotally mounted at the peripheral portion of each cage unit, rings encircling the spindle at the outer sides of the respective cage units and being spaced from the spindle, radial arms operatively connected at their inner ends with each ring, the outer ends of the arms being eccentrically connected to the respective airfoils, a bracket carried by each ring and arranged for vertical sliding movement, guide means for each sliding bracket mounted on the adjacent portion of the support, and means for moving each bracket vertically for adjusting the ring with respect to the spindle whereby to move the airfoils and to vary the resultant thrust in a vertical plane.

7. In a variable thrust mechanism, a support, a horizontal spindle mounted on the support, a pair of cage units rotatably supported on said spindle, a series of spaced airfoils pivotally mounted at the peripheral portion of each cage unit, rings encircling the spindle at the outer sides of the respective cage units and being spaced from the spindle, radial arms operatively connected at their inner ends with each ring, the outer ends of the arms being eccentrically connected to the respective airfoils, a bracket carried by each ring and arranged for vertical sliding movement, guide means for each sliding bracket mounted on the adjacent portion of the support, means for moving each bracket vertically for adjusting the rings with respect to the spindle whereby to move the airfoils and to vary the resultant thrust in a vertical plane, and additional means for adjusting the rings in a horizontal plane to maintain lateral balance of the mechanism.

8. In a variable thrust mechanism, a support, a horizontal spindle mounted on the support, a pair of cage units rotatably supported on said spindle, a series of spaced airfoils pivotally mounted at the peripheral portion of each cage unit, rings encircling the spindle at the outer sides of the respective cage units and being spaced from the spindle, radial arms operatively connected at their inner ends with each ring, the outer ends of the arms being eccentrically connected to the respective airfoils, a bracket carried by each ring and arranged for vertical sliding movement, guide means for each sliding bracket mounted on the adjacent portion of the support, means for moving each bracket vertically for adjusting the ring with respect to the spindle whereby to move the airfoils and to vary the resultant thrust in a vertical plane, and additional means for adjusting the rings in a horizontal plane to maintain lateral balance of the mechanism, said last mentioned means including a pair of members capable of horizontal sliding movement on the support, each bracket being slidable on the respective member.

9. In a variable thrust mechanism, a pair of rotatable units, a support therefor, pivoted airfoils mounted on each unit, remotely controlled means for adjusting the airfoils to vary the resultant thrust in any direction, and additional means for laterally adjusting the mechanism to maintain lateral balance for all directions of said resultant thrust.

10. In a variable thrust mechanism, a horizontal spindle, a supporting structure therefor, a pair of rotatable cages mounted on the spindle, a series of airfoils pivotally mounted at the periphery of each cage, adjustable eccentric brackets encircling the spindle and being spaced therefrom, eccentric arms connected at their outer ends to the respective airfoils, a ring formed on the inner end of each arm, said rings encircling the respective eccentric brackets, means for adjusting the brackets to effect the adjustment of the airfoils whereby to vary the resultant thrust in any direction, and additional means for laterally adjusting the mechanism to maintain lateral balance for all directions of said resultant thrust.

11. In a variable thrust mechanism, a horizontal spindle, a supporting structure therefor, a pair of rotatable cages mounted on the spindle, a series of airfoils pivotally mounted at the periphery of each cage, adjustable eccentric brackets encircling the spindle and being spaced therefrom, eccentric arms connected at their outer ends to the respective airfoils, a ring formed on the inner end of each arm, said rings encircling the respective eccentric brackets, means for moving the brackets in a vertical plane to adjust the airfoils whereby to vary the resultant thrust in a vertical direction, and additional means for moving the brackets in a horizontal plane for laterally adjusting the mechanism to maintain lateral balance.

12. In a variable thrust mechanism, a horizontal spindle, a supporting structure therefor, a pair of rotatable cages mounted on the spindle, a series of airfoils pivotally mounted at the periphery of each cage, adjustable eccentric brackets encircling the spindle and being spaced therefrom, eccentric arms connected at their outer ends to the respective airfoils, a ring formed on the inner end of each arm, said rings encircling the respective eccentric brackets, means for moving the brackets in a vertical plane to adjust the airfoils whereby to vary the resultant thrust in a vertical direction, and additional means for moving the brackets in a horizontal plane for laterally adjusting the mechanism to maintain lateral balance, said adjusting means being operated from a remote point.

In testimony whereof I affix my signature.

ISIDOR B. LASKOWITZ.